(12) United States Patent
Kajiyama

(10) Patent No.: US 12,322,212 B2
(45) Date of Patent: Jun. 3, 2025

(54) IMAGE PROCESSING DEVICE AND IMAGE PROCESSING METHOD

(71) Applicant: Nissan Motor Co., Ltd., Kanagawa (JP)

(72) Inventor: Naoto Kajiyama, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 45 days.

(21) Appl. No.: 18/569,515

(22) PCT Filed: Dec. 2, 2021

(86) PCT No.: PCT/JP2021/044346
§ 371 (c)(1),
(2) Date: Dec. 12, 2023

(87) PCT Pub. No.: WO2022/264453
PCT Pub. Date: Dec. 22, 2022

(65) Prior Publication Data
US 2024/0273951 A1    Aug. 15, 2024

(30) Foreign Application Priority Data
Feb. 15, 2021 (WO) .................. PCT/JP2021/022695

(51) Int. Cl.
*G06T 7/70* (2017.01)
*B60K 35/10* (2024.01)
(Continued)

(52) U.S. Cl.
CPC .............. *G06V 40/67* (2022.01); *B60K 35/10* (2024.01); *B60K 35/22* (2024.01); *B60K 35/28* (2024.01); *G06T 7/70* (2017.01); *G06V 20/59* (2022.01); *G06V 40/172* (2022.01); *B60K 2360/165* (2024.01); *B60K 2360/21* (2024.01); *B60K 2360/31* (2024.01);
(Continued)

(58) Field of Classification Search
CPC ....................................................... G06T 7/70
USPC ........................................................... 348/77
See application file for complete search history.

(56) References Cited

U.S. PATENT DOCUMENTS

| 9,602,803 B2 | 3/2017 | Tamura et al. |
| 2015/0124053 A1 | 5/2015 | Tamura et al. |

(Continued)

FOREIGN PATENT DOCUMENTS

| JP | 2008015800 A | 1/2008 |
| JP | 2008017227 A | 1/2008 |

(Continued)

*Primary Examiner* — Amir Shahnami
(74) *Attorney, Agent, or Firm* — Osha Bergman Watanabe & Burton LLP

(57) ABSTRACT

A controller of an image processing device performs registration or authentication of face data of a user by using a plurality of face images which are different from each other and in which orientations of a face captured by a camera are each within a first angle that is based on a state in which the user faces a front of the camera, and displays on a display a video in which a human face-imitating image changes its face orientation until the registration or the authentication is completed. A second angle formed by a direction from a seating position of the user toward the camera and a direction from the seating position of the user toward the display is smaller than the first angle.

12 Claims, 11 Drawing Sheets

(51) Int. Cl.
  *B60K 35/22*  (2024.01)
  *B60K 35/28*  (2024.01)
  *G06V 20/59*  (2022.01)
  *G06V 40/16*  (2022.01)
  *G06V 40/60*  (2022.01)
(52) U.S. Cl.
  CPC ............ *G06T 2207/10016* (2013.01); *G06T 2207/30201* (2013.01); *G06T 2207/30268* (2013.01)

(56) References Cited

U.S. PATENT DOCUMENTS

2017/0124312 A1\*  5/2017  Inoue ..................... H04L 9/32
2019/0080065 A1    3/2019  Sheik-Nainar

FOREIGN PATENT DOCUMENTS

| JP | 2009113621 A  | 5/2009 |
| JP | 2010006362 A  | 1/2010 |
| JP | 201590662 A   | 5/2015 |
| JP | 2019083015 A  | 5/2019 |
| JP | 2019134397 A  | 8/2019 |
| JP | 2019212156 A  | 12/2019 |
| WO | 2015194135 A1 | 12/2015 |

\* cited by examiner

IMAGE PROCESSING DEVICE AND IMAGE PROCESSING METHOD

TECHNICAL FIELD

The invention relates to an image processing device and an image processing method.

BACKGROUND ART

Patent Literature 1 describes a technique for recognizing the face of a user in a car. In the invention described in Patent Literature 1, a camera attached to the car captures an image of the user, and the face of the user is recognized by using face feature information of the captured face image and previously registered face feature information.

CITATION LIST

Patent Literature

Patent Literature 1: Japanese Unexamined Patent Application Publication No. 2008-017227

SUMMARY OF THE INVENTION

However, when the camera captures an image of a user, the user may not always be facing an appropriate direction. In this case, it may take time to register or authenticate the user's face data.

In response to the above issue, an object of the present invention is to provide an image processing device and an image processing method capable of reducing the time required for registering or authenticating user's face data.

TECHNICAL SOLUTION

An image processing device according to one aspect of the present invention performs registration or authentication of face data of a user by using a plurality of face images which are different from each other and in which orientations of a face captured by the camera are each within a first angle that is based on a state in which the user faces a front of the camera, and displays on a display a video in which a human face-imitating image changes a face orientation until the registration or the authentication is completed, and a second angle formed by a direction from a seating position toward the camera and a direction from the seating position of the user toward the display is smaller than the first angle.

Advantageous Effects

The present invention reduces the time required for registration or authentication of user's face data.

DETAILED DESCRIPTION OF THE INVENTION

An embodiment of the present invention will be described below with reference to the drawings. In the description of the drawings, the same parts are denoted by the same reference signs, and the description thereof will be omitted.

Figure 1:
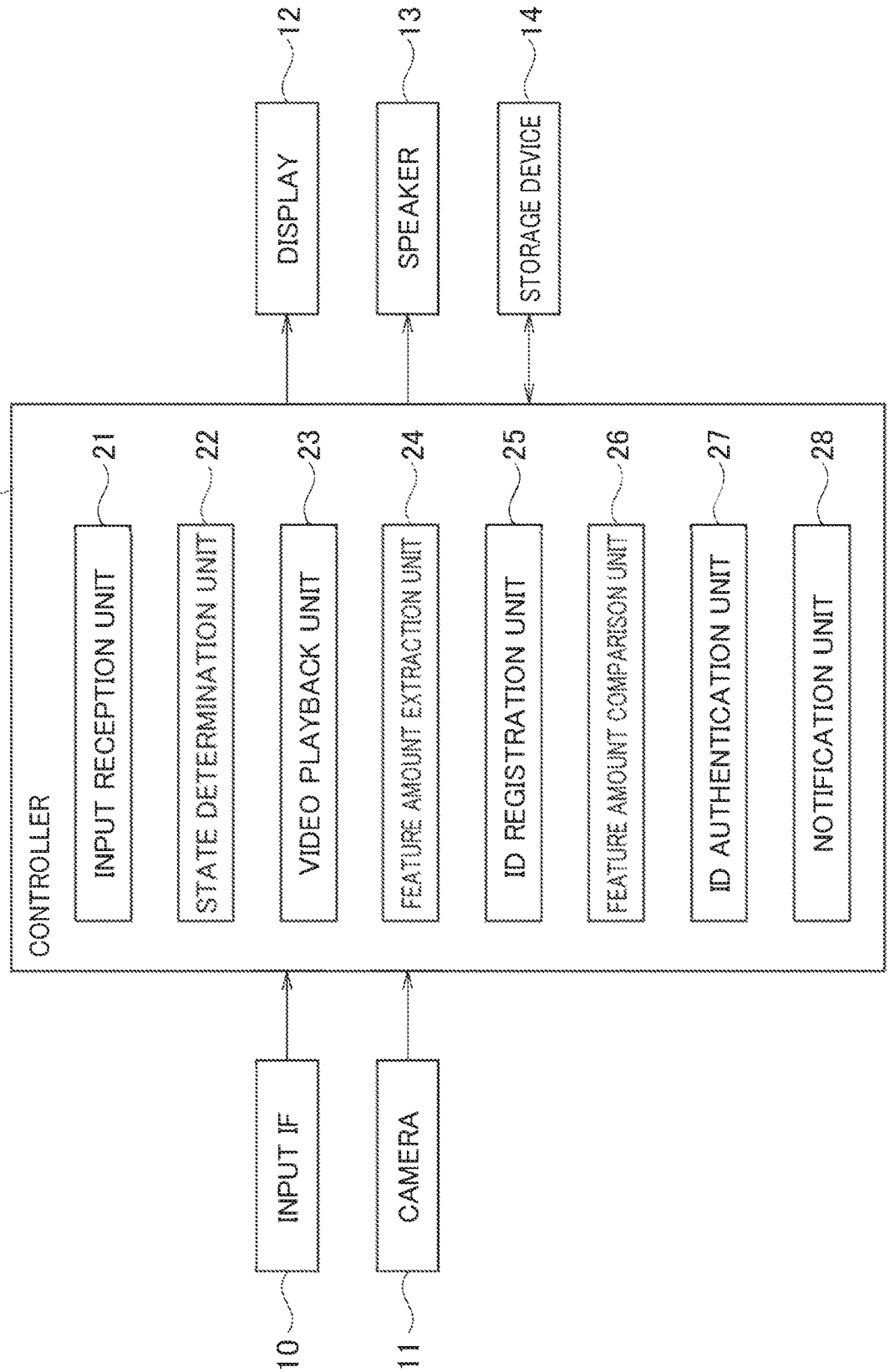
FIG. 1 is a configuration diagram of an image processing device 1 according to an embodiment of the present invention.

A configuration example of the image processing device 1 will be described with reference to FIGS. 1 and 2. As illustrated in FIG. 1, the image processing device 1 includes an input interface (IF) 10, a camera 11, a controller 20, a display 12, a speaker 13, and a storage device 14.

The image processing device 1 according to the present embodiment is a device for executing processing related to face authentication of users (mainly drivers). Face authentication includes two phases. One is a phase of newly registering face data of a user. The other is a phase of utilizing registered face data. The phase of utilizing registered face data is a phase of authenticating face data by matching a camera image with registered face data, for example.

The input IF 10 is a virtual button displayed on the display 12 or a mechanical switch installed near the display 12. The input IF 10 is used when a user newly registers face data.

The camera 11 includes an imaging sensor such as a CCD (charge-coupled device) or a CMOS (complementary metal oxide semiconductor). The camera 11 is installed in a vehicle. For example, as illustrated in FIG. 2, the camera 11 is installed in a center part of the steering wheel. The camera 11 mainly images the face of the user sitting in the driver's seat. The image captured by the camera 11 is output to the controller 20. Reference sign 30 in FIG. 2 is a human face-imitating CG image (CG: computer graphics). Reference sign 30 is hereinafter referred to as a face image 30.

Figure 2:
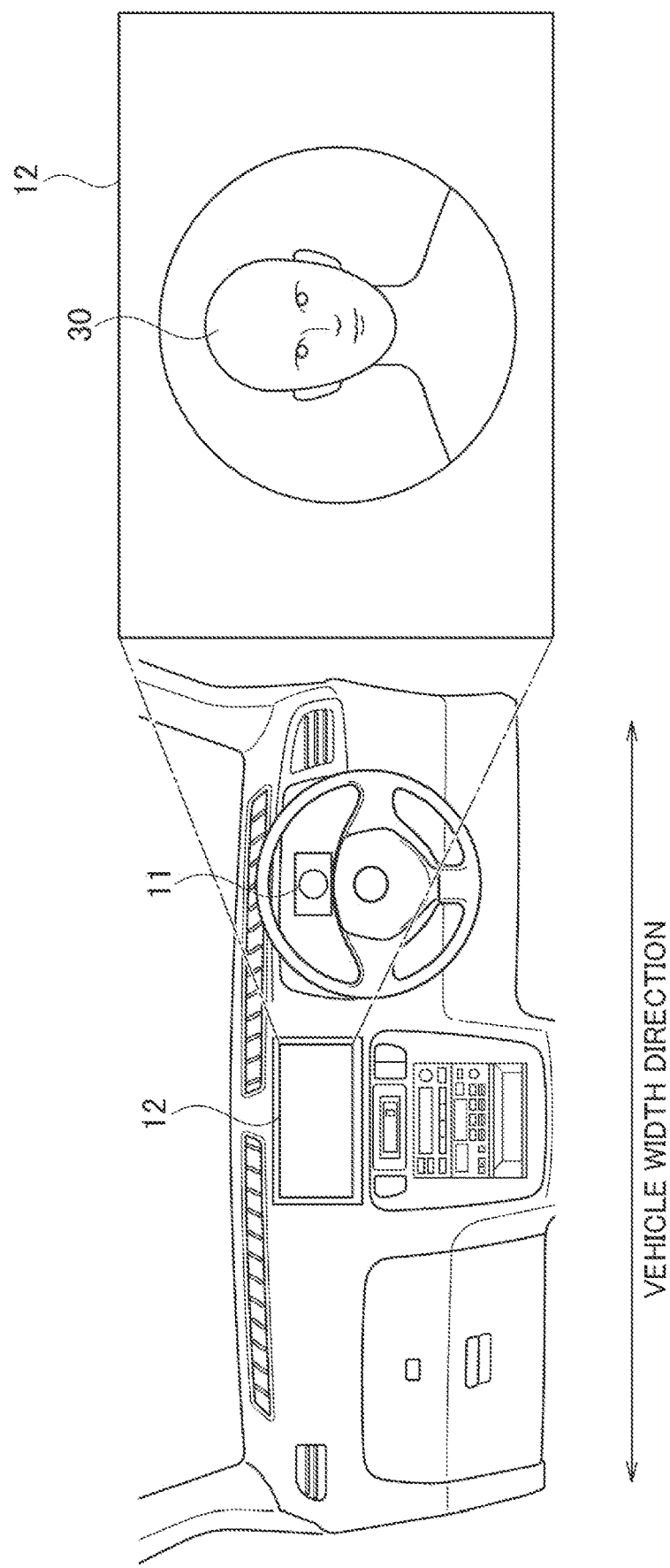
FIG. 2 is a diagram illustrating the positions where a camera 11 and a display 12 are installed.

As illustrated in FIG. 2, the display 12 is installed in a center part of the instrument panel. A video playback unit 23 described below plays videos on the display 12. The video in the present embodiment is constituted by images in which the face image 30 changes the face orientation. In other words, the video is constituted by images in which the face image 30 shakes the head. As illustrated in FIG. 2, the camera 11 and the display 12 are installed side by side in the vehicle width direction.

The controller 20 is a general-purpose microcomputer having a CPU (central processing unit), a memory, and an input/output unit. A computer program for causing the microcomputer to function as the image processing device 1 is installed in the microcomputer. By executing the computer program, the microcomputer functions as multiple information processing circuits provided in the image processing device 1. Note that here, an example of realizing multiple information processing circuits provided in the image processing device 1 using software is described, but of course, it is also possible to configure the information processing circuits by preparing dedicated hardware for executing each information processing described below. The multiple information processing circuits may be configured by individual hardware. The controller 20 includes, as multiple information processing circuits, an input reception unit 21, a state determination unit 22, a video playback unit 23, a feature amount extraction unit 24, an ID registration unit 25, a feature amount comparison unit 26, an ID authentication unit 27, and a notification unit 28.

Figure 3:
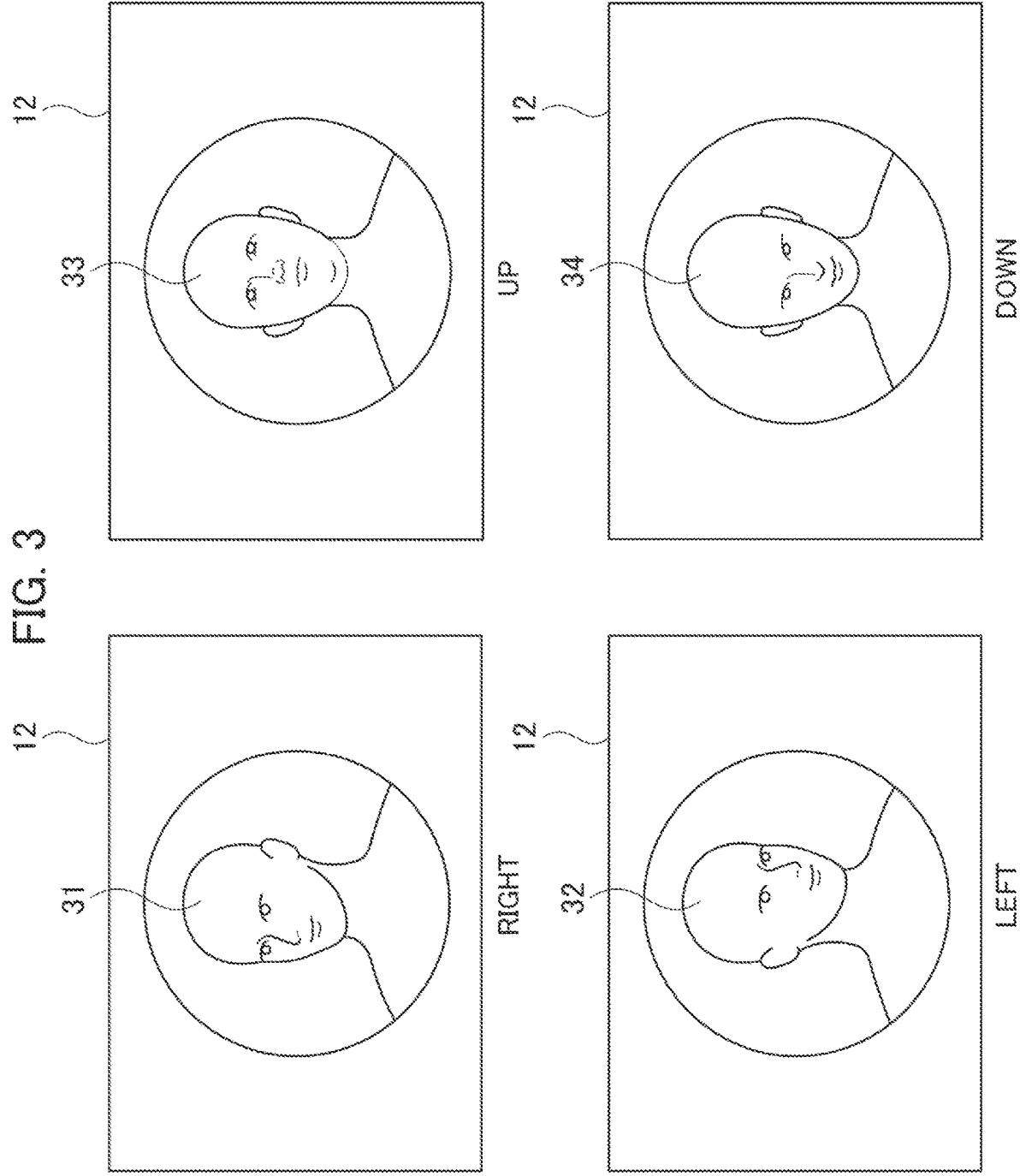
FIG. 3 is a diagram illustrating a video in which human face-imitating CG images change the orientation of the face.

Referring now to FIG. 3, a phase of newly registering face data of a user will be described. As a prerequisite, the user sits in the driver's seat of the vehicle. When the user registers face data, the user presses a register button (input IF 10). The register button may be a virtual button displayed on the display 12 or a mechanical switch installed near the display 12. The user's input is transmitted to the input reception unit 21. When receiving the input from the user, the input reception unit 21 transmits a signal indicating the reception to the state determination unit 22. When receiving the signal from the input reception unit 21, the state determination unit 22 determines the state of the vehicle. Specifically, the state determination unit 22 determines whether or not the power supply state of the vehicle is "IGN-ON". The "IGN-ON" power supply state of the vehicle is defined as a state in which the power switch installed in the vehicle is turned on and all electrical components including the meter and blower motor are activated. In addition, the state determination unit 22 determines whether the shift position is "P" or not. In the present embodiment, as a condition for registering a face ID, it is required that the power supply state of the vehicle is "IGN-ON" and the shift position is "P". Note that, instead of "IGN-ON", the condition may be that the power supply switch is on. That is, a condition that the power switch of the vehicle is on and the shift position is "P" may be adopted as the condition for registering a face ID.

When determining that the condition for registering a face ID is satisfied, the state determination unit 22 transmits a signal indicating the determination result to the video playback unit 23. "Satisfying the condition for registering a face ID" means that the power supply state of the vehicle is "IGN-ON" and the shift position is "P" When receiving a signal from the state determination unit 22, the video playback unit 23 plays the video on the display 12. The video played by the video playback unit 23 will be described with reference to FIG. 3. The video is stored in the storage device 14. The storage device 14 includes an HDD (Hard Disk Drive) or an SSD (Solid State Drive). The video playback unit 23 plays a video stored in the storage device 14. As illustrated in FIG. 3, face images change the face orientation in the video. In other words, face images move and shake the head. A face image 31 faces to the right. A face image 32 faces to the left. A face image 33 faces upward. A face image 34 faces downward. Note that the video does not necessarily need to be stored in the storage device 14. For example, the video may be stored in a cloud-type server (what is called a cloud server). When the video is stored in a cloud server, the controller 20 may access the cloud server and play the video. This ensures that the latest video is always available.

Figure 4:
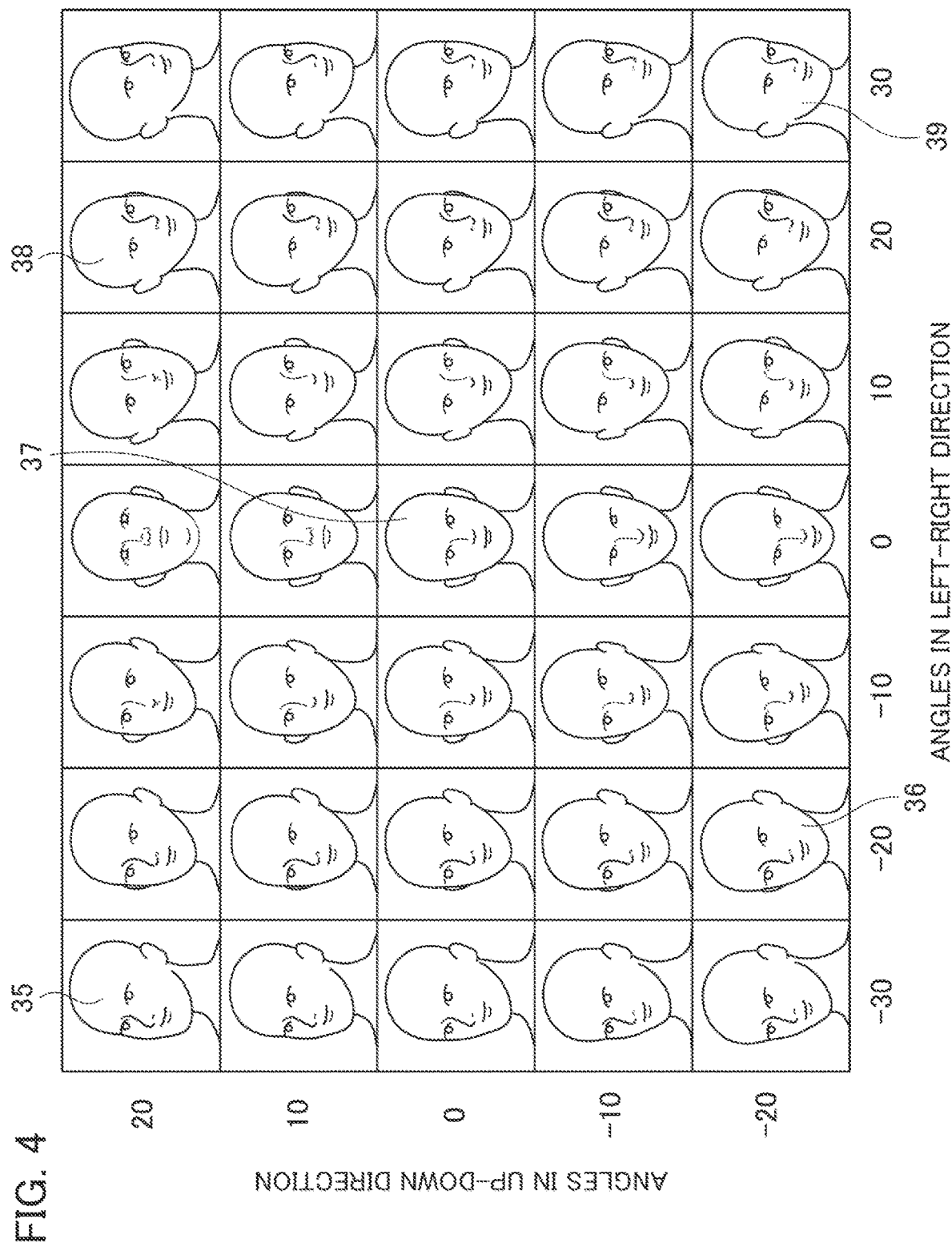
FIG. 4 is a diagram illustrating an example of angles regarding the face orientation.

An example of face orientation angles (head angles) will be described with reference to FIG. 4. As illustrated in FIG. 4, head angles in the vertical direction are in a range of +20 degrees to −20 degrees. Head angles in the lateral direction are in a range of +30 degrees to −30 degrees. When the user faces the front of the camera 11 (reference sign 37), the angles in the vertical direction and the lateral direction are defined as 0 degrees. This state serves as the reference of angles. The angle values described above indicate a change from this reference. Angles in the up and left directions are positive, and angles in the down and right directions are negative. In the present embodiment, the video in which the human face-imitating CG image changes its face orientation is repeatedly played. The head angles of the human face-imitating CG image are angles for capturing images with face orientations required for registration or authentication of a face ID.

The user moves his or her face (head) so that the orientation of his/her face is the same as the orientation of the face in the video. When the user moves the face, the camera 11 captures multiple face images each having a different orientation of the face. Face images 35 to 39 illustrated in FIG. 4 are an example of "multiple face images each having a different face orientation". The orientation of the face image 35 is 20 degrees in the upward direction and 30 degrees in the right direction. The orientation of the face image 36 is 20 degrees in the downward direction and 20 degrees in the right direction. The orientation of the face image 37 is front (0 degrees in the vertical direction and the horizontal direction). The orientation of the face image 38 is 20 degrees in the upward direction and 20 degrees in the left direction. The orientation of the face image 39 is 20 degrees in the downward direction and 30 degrees in the left direction. The camera 11 captures five face images (face images 35 to 39) each having a different face orientation. However, the five images are an example, and three or four images may be used as long as there are multiple images. Note that it is sufficient that the orientations of the face are different from each other, and the front image such as the face image 37 is not essential.

The multiple face images 35 to 39 captured by the camera 11 are transmitted to the feature amount extraction unit 24. The feature amount extraction unit 24 extracts features of face data using the multiple face images 35 to 39 acquired from the camera 11. As an example, the feature amount extraction unit 24 extracts features of face data using a convolutional neural network (CNN). However, the feature extraction method is not limited to this, and other machine learning algorithms may be used. Note that since the feature extraction method using machine learning algorithms is a well-known technique, the detailed description thereof will be omitted. The reason why multiple face images each having a different face orientation are captured in the present embodiment is to extract features of face data with high accuracy.

The feature amount extraction unit 24 transmits the extracted features of face data to the ID registration unit 25. The ID registration unit 25 registers a face ID using features of face data acquired from the feature amount extraction unit 24. The registered face ID is stored in the storage device 14. Thus, the registration of the face ID is completed. The ID registration unit 25 transmits a signal indicating that the registration of the face ID has been completed to the video playback unit 23 and the notification unit 28. When receiving the signal, the video playback unit 23 stops the video, and the notification unit 28 notifies the user that the registration has been completed. As a notification method, the notification unit 28 may display the text "Registration of the face ID is completed" on the display 12 or may use voice.

In other words, the video playback unit 23 plays the video until registration of the face ID is completed. The user moves the face in the same manner as in the video until registration of the face ID is completed. This makes it possible to capture multiple face images each having a different face orientation in a short time, and reduces the time required for registration of face data.

Figure 5:
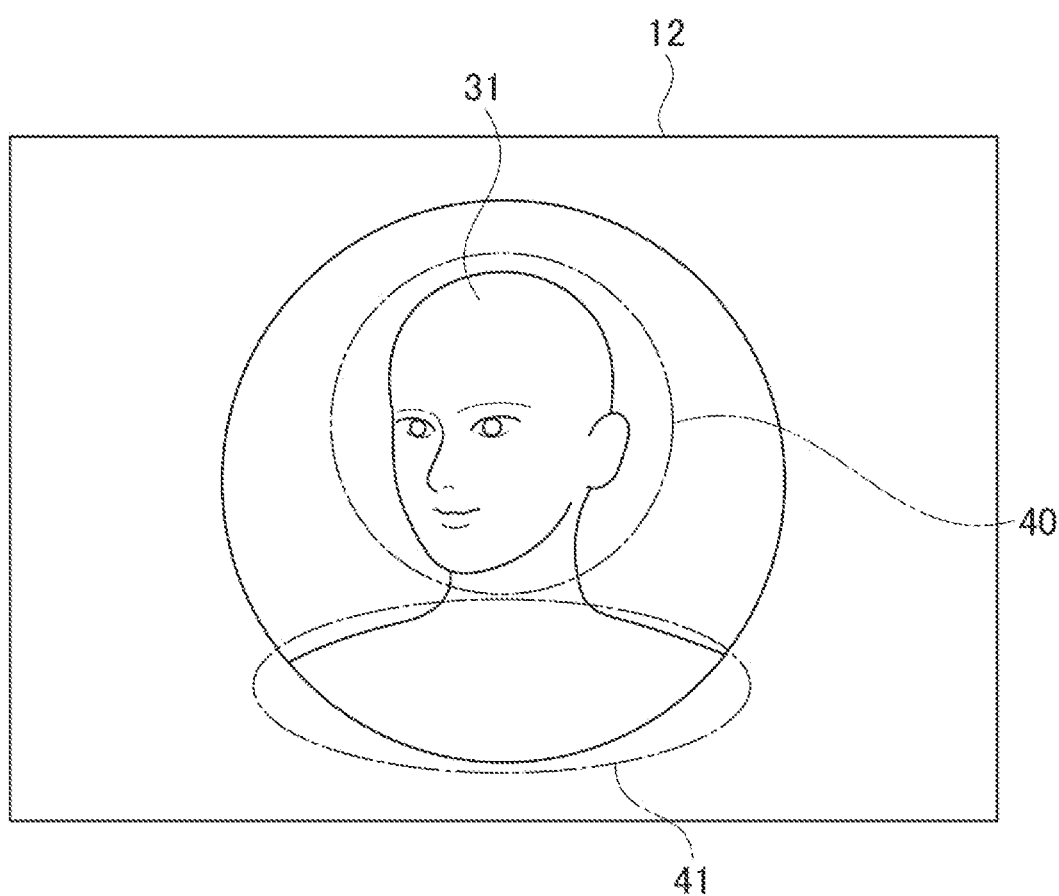
FIG. 5 is a diagram illustrating a human face-imitating CG image

In the video, face images change the face orientation (shaking the head), but there are a moving part and a non-moving part. As illustrated in FIG. 5, in the face image 31 displayed on the display 12, an area 40 above the neck moves, and an area 41 below the neck does not move. The area 40 includes the face and the neck itself. The area 41 includes the upper body part from the chest to the neck.

Figure 6:
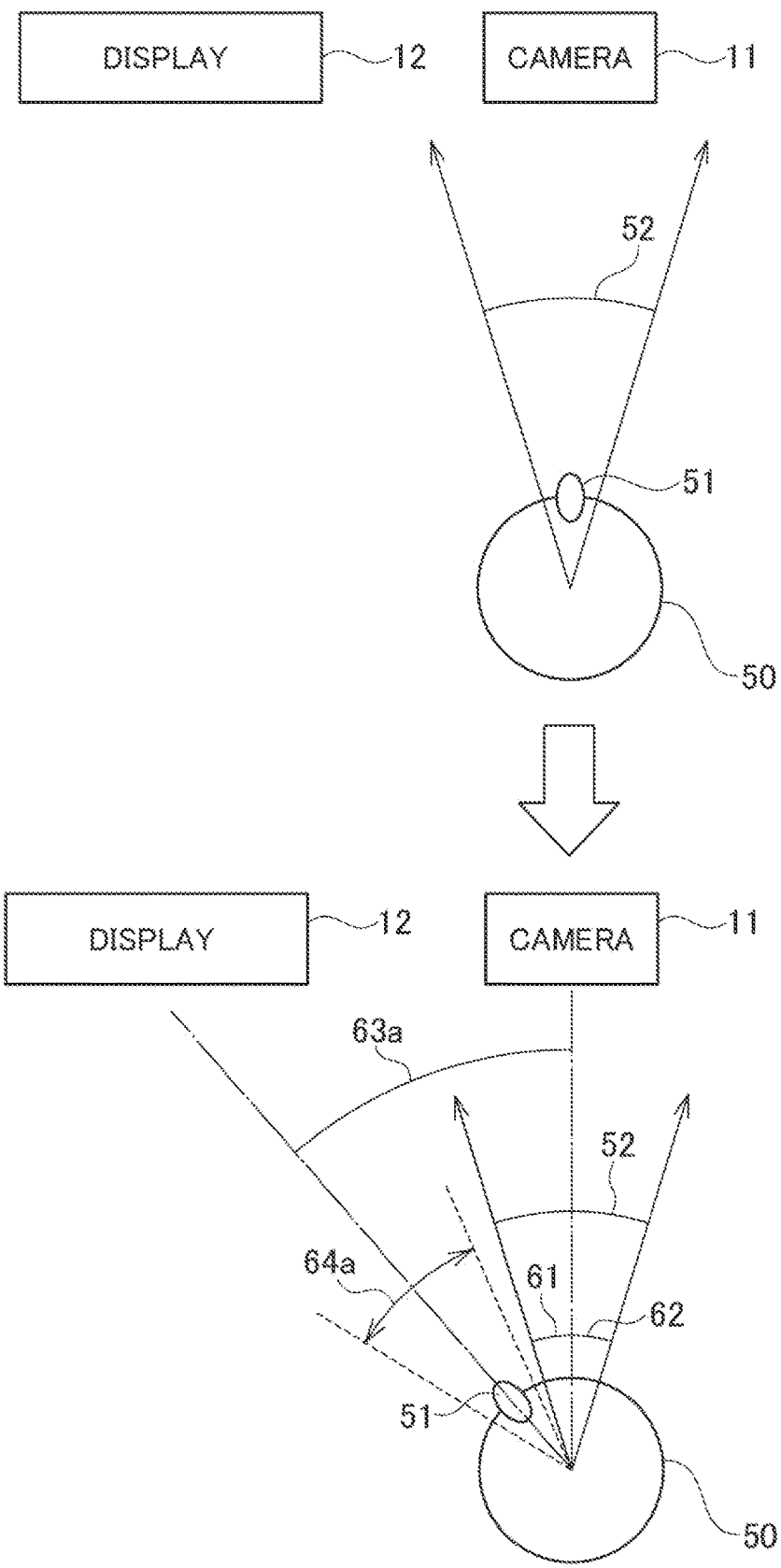
FIG. 6 is a diagram illustrating an example of the positional relationship between the camera 11 and the display 12.

As illustrated in FIG. 6, the position where the display 12 is installed and the position where the camera 11 is installed are different (see FIG. 2 for the positional relationship). In FIG. 6, reference sign 50 indicates a user, and reference sign 51 indicates a user's nose (the orientation of the user's face). The upper view of FIG. 6 illustrates a state where the user faces the front of the camera 11. Reference sign 52 denotes a predetermined angle. The predetermined angle is based on a state in which the user 50 faces the front of the camera 11, and is defined as an angle for causing a large amount of face data to be included in face images captured by the camera 11. That is, the predetermined angle 52 is a range of angles of face orientations in images required for registration or authentication of the face ID. In the video displayed on the display 12, a human face-imitating image changes its face orientation (shaking the head) within a range of angles equal to the predetermined angle 52. The face orientation of the user 50 is preferably included within the range of the predetermined angle 52. Note that the predetermined angle 52 is obtained through experiments and simulation. The predetermined angle 52 is composed of first angles 61 and 62 in the left and right directions on the basis of a state where the user 50 faces the front of the camera 11. An example of first angles 61 and 62 is 30 degrees in the left direction and 30 degrees in the right direction on the basis of a state where the user faces the front of the camera 11 (0 degrees in the up and down directions and the left and right directions). In this case, the range of the predetermined angle 52 is 60 degrees.

In the present embodiment, the user 50 moves the face while gazing at the video displayed on the display 12. Then, the line of sight of the user 50 is necessarily directed to the display 12 (lower view of FIG. 6). Reference sign 63*a* in FIG. 6 indicates a second angle formed by a direction from the seating position of the user 50 toward the camera 11 and a direction from the seating position of the user 50 toward the display 12. "Direction from the seating position of the user 50 toward the camera 11" may be expressed as "direction of line of sight of the user 50 when the user 50 looks at the camera 11". Similarly, "direction from the seating position of the user 50 toward the display 12" may be expressed as "direction of line of sight of the user 50 when the user 50 looks at the display 12". Reference sign 64*a* in FIG. 6 indicates a range of angles in which the user 50 moved the face in the left and right directions while gazing at the video. When the user 50 moves his/her face so that the face orientation is the same as the face orientation in the video, the size of the range 64*a* becomes the same as the size of the predetermined angle 52.

As illustrated in the lower view of FIG. 6, when the display 12 is installed at a position such that the second angle 63*a* becomes larger than the predetermined angle 52, the range 64*a* does not overlap with the range of the predetermined angle 52. In this case, the face orientation of face images captured by the camera 11 when the user 50 moved the face in the left and right directions while gazing at the video is not included in the range of the predetermined angle 52. That is, even when the user 50 moves the face in the same manner as in the video while gazing at the video, it may be difficult to acquire images having face orientations required for registration or authentication of a face ID.

In order to quickly acquire images having face orientations required for registration or authentication of a face ID, it is preferable that the angle range in which the user moved the face in the left and right directions while gazing at the video overlaps with the range of the predetermined angle 52. Therefore, in the present embodiment, the camera 11 and the display 12 are installed at positions such that the angle range in which the user 50 moved the face in the left and right directions while gazing at the video overlaps with the range of the predetermined angle 52. When the camera 11 and the display 12 are installed close to each other, the angle of the second angle 63*a* is reduced, and the range of the angle 64*a* in which the user 50 moved the face in the left and right directions while gazing at the video approaches the range of the predetermined angle 52.

Figure 7:
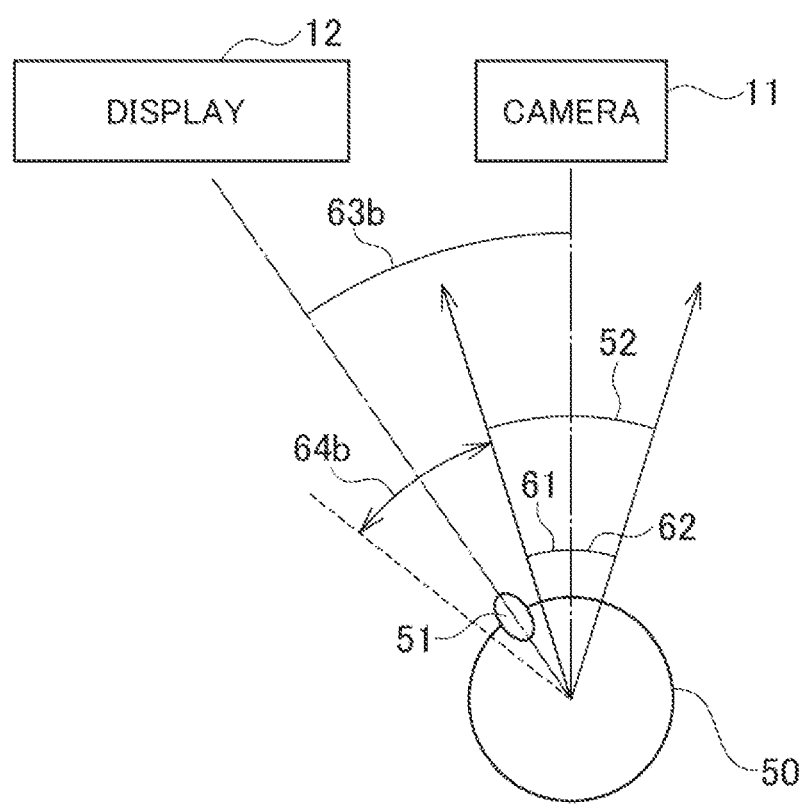
FIG. 7 is a diagram illustrating an example of the positional relationship between the camera 11 and the display 12.

In the present embodiment, for example, as illustrated in FIG. 7, the camera 11 and the display 12 are installed at positions such that the second angle 63*b* is smaller than the predetermined angle 52 composed of the first angles 61 and 62. A range 64*b* is a range in which the range 64*a* is offset clockwise. Since the range 64*b* partially overlaps with the range of the predetermined angle 52, one face orientation of the user 50 can be captured within the range of the predetermined angle 52.

Figure 8:
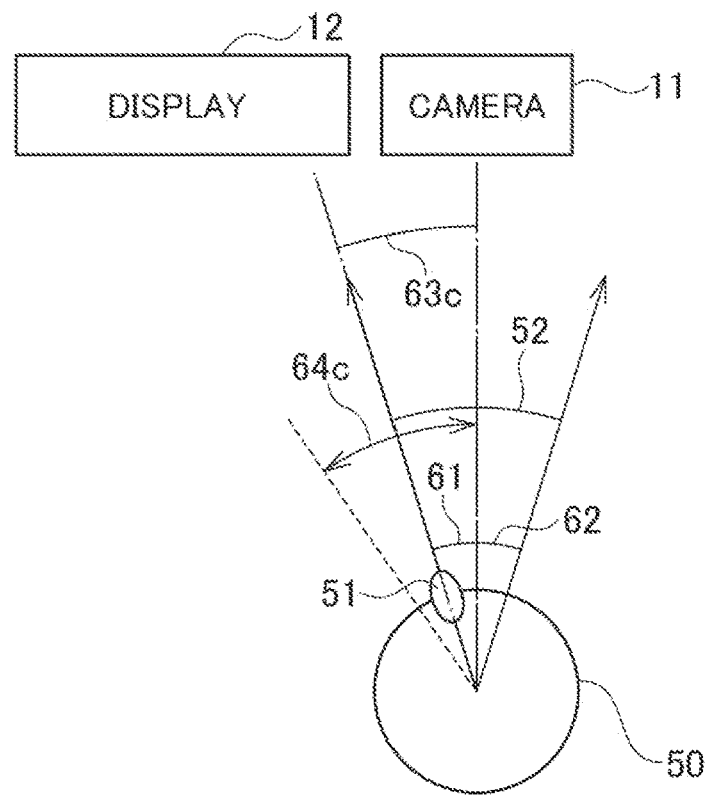
FIG. 8 is a diagram illustrating an example of the positional relationship between the camera 11 and the display 12.

As illustrated in FIG. 8, the camera 11 and the display 12 may be installed at positions such that the second angle 63*b* is smaller than the first angles 61 and 62. A range 64*c* is a range in which the range 64*b* is further offset clockwise, and a second angle 63*c* in FIG. 8 is smaller than the second angle 63*b* in FIG. 7. In this case, the range 64*c* has a larger portion that overlaps with the range of the predetermined angle 52 compared with the range 64*b*, and left and right face orientations of the user 50 can be captured within the range of the predetermined angle 52. As described above, the distance between the camera 11 and the display 12 is preferably short. Instead of adjusting the positional relationship between the camera 11 and the display 12, the range of the predetermined angle 52 may be adjusted so that the range of the predetermined angle 52 is larger than the second angle.

Figure 9:
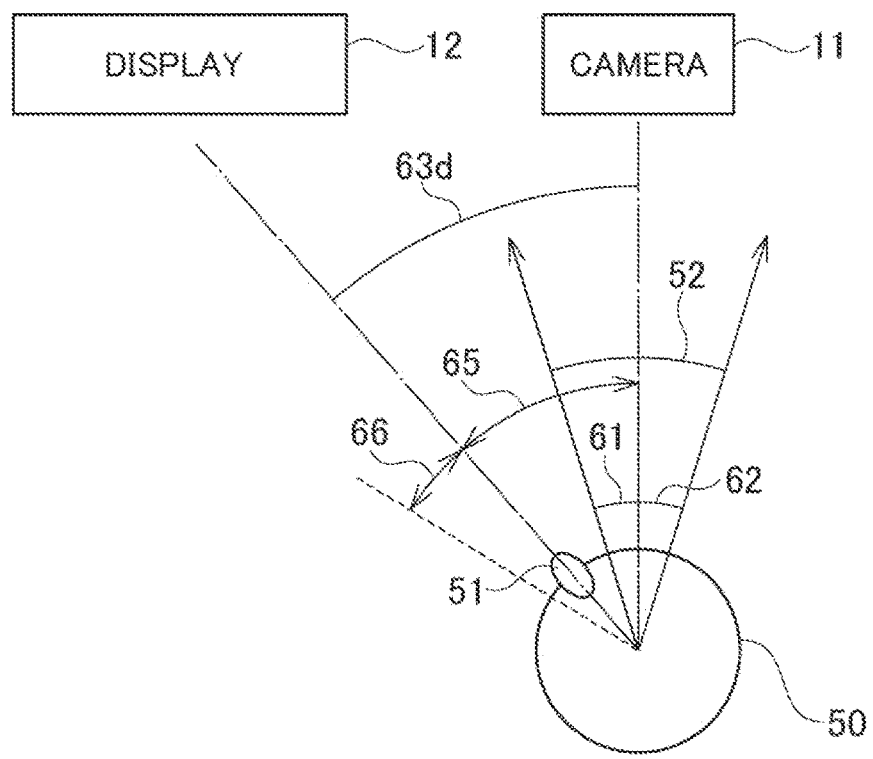
FIG. 9 is a diagram illustrating an example of the positional relationship between the camera 11 and the display 12.

Instead of adjusting the positional relationship between the camera 11 and the display 12 or the range of the predetermined angle 52, the angle at which the human face-imitating image shakes the head may be adjusted so that the angle range in which the user 50 moved the face in the left and right directions while gazing at the video overlaps with the range of the predetermined angle 52. For example, as illustrated in FIG. 9, the angle at which the human face-imitating image shakes the head may be adjusted so that the range 65 in which the user 50 moves the face in the right direction while gazing at the video becomes larger than the second angle 63*d* on the basis of a state where the user 50 faces the front of the display 12. Specifically, the video playback unit 23 plays a video in which the angle at which the human face-imitating image shakes the head in the left direction (corresponding to the range 65 in which the user moves the face in the right direction) becomes larger than the second angle 63*d*. Thus, even when the range of the second angle 63*d* is larger than the range of the predetermined angle 52, the range 65 in which the user 50 moves the face in the right direction while gazing at the video partially overlaps with the predetermined angle 52, so that left and right face orientations of the user 50 can be captured within the range of the predetermined angle 52.

Next, an operation example of the image processing device 1 will be described with reference to the flowchart of FIG. 10.

In step S101, the input reception unit 21 receives input from a user. When receiving the input from the user, the input reception unit 21 transmits a signal indicating the reception to the state determination unit 22. The processing proceeds to step S103, and when receiving the signal from the input reception unit 21, the state determination unit 22 determines the state of a vehicle. When determining that the condition for registering a face ID is satisfied, the state determination unit 22 transmits a signal indicating the determination result to the video playback unit 23. The processing proceeds to step S105, and when receiving the signal from the state determination unit 22, the video playback unit 23 plays a video on the display 12 (see FIG. 3). When the video is displayed on the display 12, the notification unit 28 notifies the user to turn the face in the direction of the camera 11 and to change the face orientation in the vertical and horizontal directions in the same manner as in the video, until registration or authentication of the face ID is completed. As a notification method, there is a notification using text information or a notification using voice. As the notification using text information, the notification unit 28 may display the text "Please turn your face in the direction of the camera, and change your face orientation up, down, left, and right in the same manner as in the video" on the display 12. As the notification using voice, the notification unit 28 may provide, through the speaker 13, the voice notification "Please turn in the direction of the camera and change the orientation of your face up, down, left, and right in the same manner as in the video".

The processing proceeds to step S107, and when the user is moving the face while gazing at the video, the camera 11 captures multiple face images which are different from each other and in which face orientations are each within the first angles 61 and 62 on the basis of a state where the user faces the front of the camera 11.

The processing proceeds to step S109, and the feature amount extraction unit 24 determines whether or not the features of face data can be extracted. The determination method is not particularly limited, and for example, when it is detected that the user is wearing a mask, the feature amount extraction unit 24 determines that the features of face data cannot be extracted (NO in step S109). In contrast, when it is not detected that the user is wearing a mask, the feature amount extraction unit 24 determines that the features of face data can be extracted (YES in step S109). In the case of NO in step S109, the processing is interrupted. At this time, the notification unit 28 may notify "Please remove the mask and take the image again" or may notify "Are you wearing something to hide your face?".

When YES in step S109, the processing proceeds to step S111, and the feature amount extraction unit 24 determines whether or not multiple images have been acquired within a predetermined time. When the camera 11 has not been able to acquire multiple images after the predetermined time has elapsed (NO in step S111), the processing proceeds to step S113, and the notification unit 28 prompts the user to retry imaging and notifies the user, when the video is displayed on the display 12, to turn the face in the direction of the camera 11 and to change the face orientation in the same manner as in the video until registration or authentication of the face ID is completed. The notification method is the same as that in step S105. After alerting the user through the notification, the processing returns to step S101. When YES in step S111, the processing proceeds to step S115, and the feature amount extraction unit 24 extracts the features of face data using multiple face images acquired from the camera 11. The feature amount extraction unit 24 transmits the extracted features of face data to the ID registration unit 25. The processing proceeds to step S117, and the ID registration unit 25 registers a face ID using the features of face data acquired from the feature amount extraction unit 24. The ID registration unit 25 transmits a signal indicating that the registration of the face ID has been completed to the video playback unit 23 and the notification unit 28. The processing proceeds to step S119, and the video playback unit 23 stops the video when receiving the signal, and the notification unit 28 notifies the user that the registration has been completed.

Figure 11:
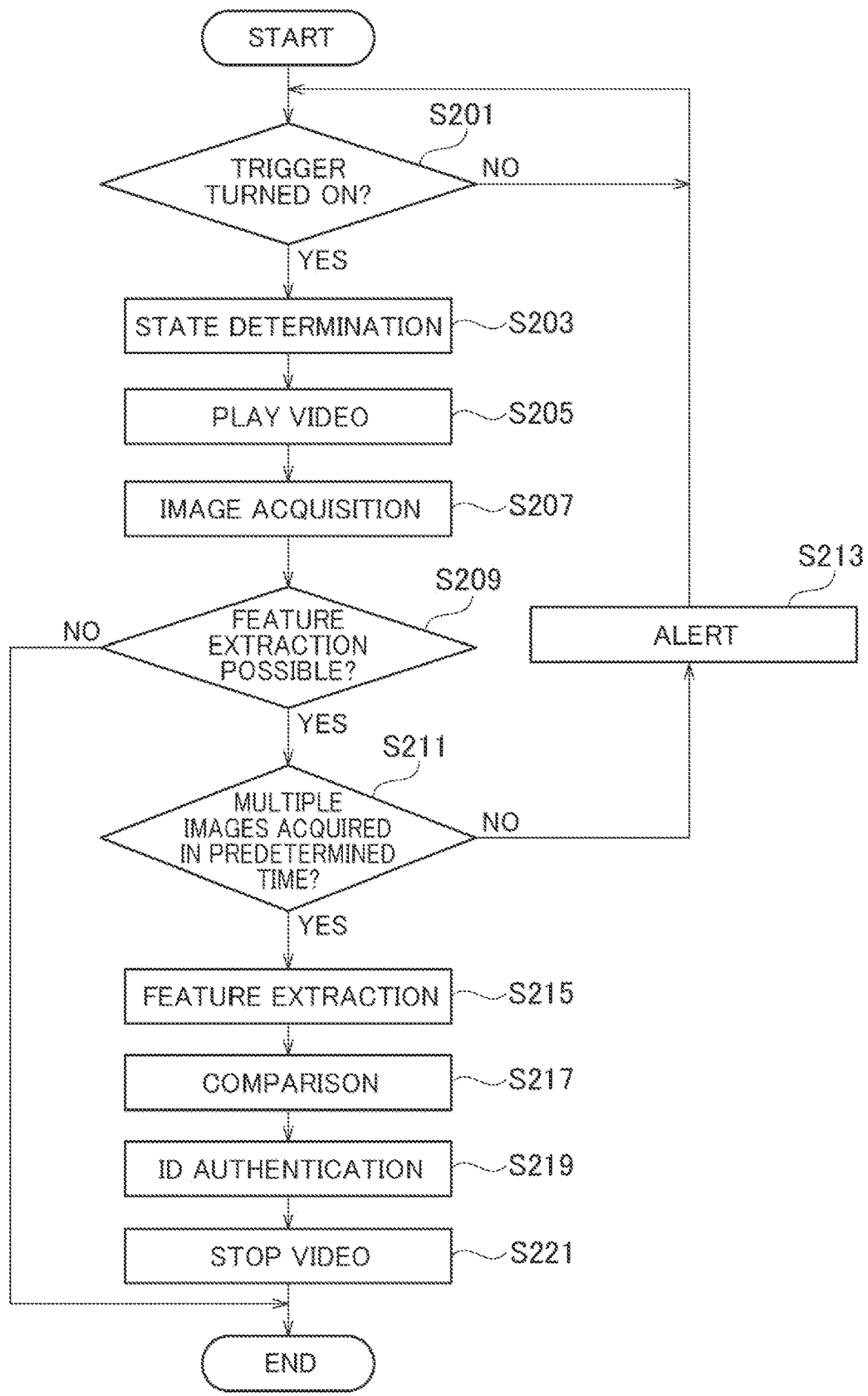
FIG. 11 is a flowchart illustrating an operation example of the image processing device 1 according to the embodiment of the present invention.

Next, referring to the flowchart of FIG. 11, the phase of authenticating face data will be described. In step S201, the input reception unit 21 determines whether or not the trigger for authentication is turned on. "Trigger for authentication is turned on" is one of "accessories are turned on", "user has pressed the authentication button (input IF 10)", and "receiving a signal indicating that the vehicle door has been opened and then closed". In the present embodiment, "accessories are turned on" is defined as a state in which the power switch installed in the vehicle is turned on and all electrical components except the meter and blower motor are activated. However, the definition of "accessories are turned on" is not limited to this. A predetermined signal is transmitted to the controller 20 when the user presses the unlocking switch of an intelligence key possessed by the user before entering the vehicle. Upon receiving the predetermined signal, the controller 20 transitions the power position from the power off to a predetermined state. This state may be defined as "accessories are turned on". The intelligence key is used to remotely unlock and lock the door. The intelligence key may also be described as a smart key or a remote key. In addition, instead of "receiving a signal indicating that the vehicle door has been opened and then closed", "receiving a signal indicating that the vehicle door has been opened" or "receiving a signal indicating that the vehicle door has been closed" may be employed as the trigger. When the trigger for authentication is turned on (YES in step S201), the processing proceeds to step S203, and the state determination unit 22 determines the state of the vehicle. When determining that the condition for authenticating a face ID is satisfied, the state determination unit 22 transmits a signal indicating the determination result to the video playback unit 23. "Satisfying the condition for authenticating a face ID" means that the power supply state of the vehicle is "IGN-ON" and the shift position is "P". Note that "satisfying the condition for authenticating a face ID" may be that "accessories are turned on" and the shift position is "P".

Figure 10:
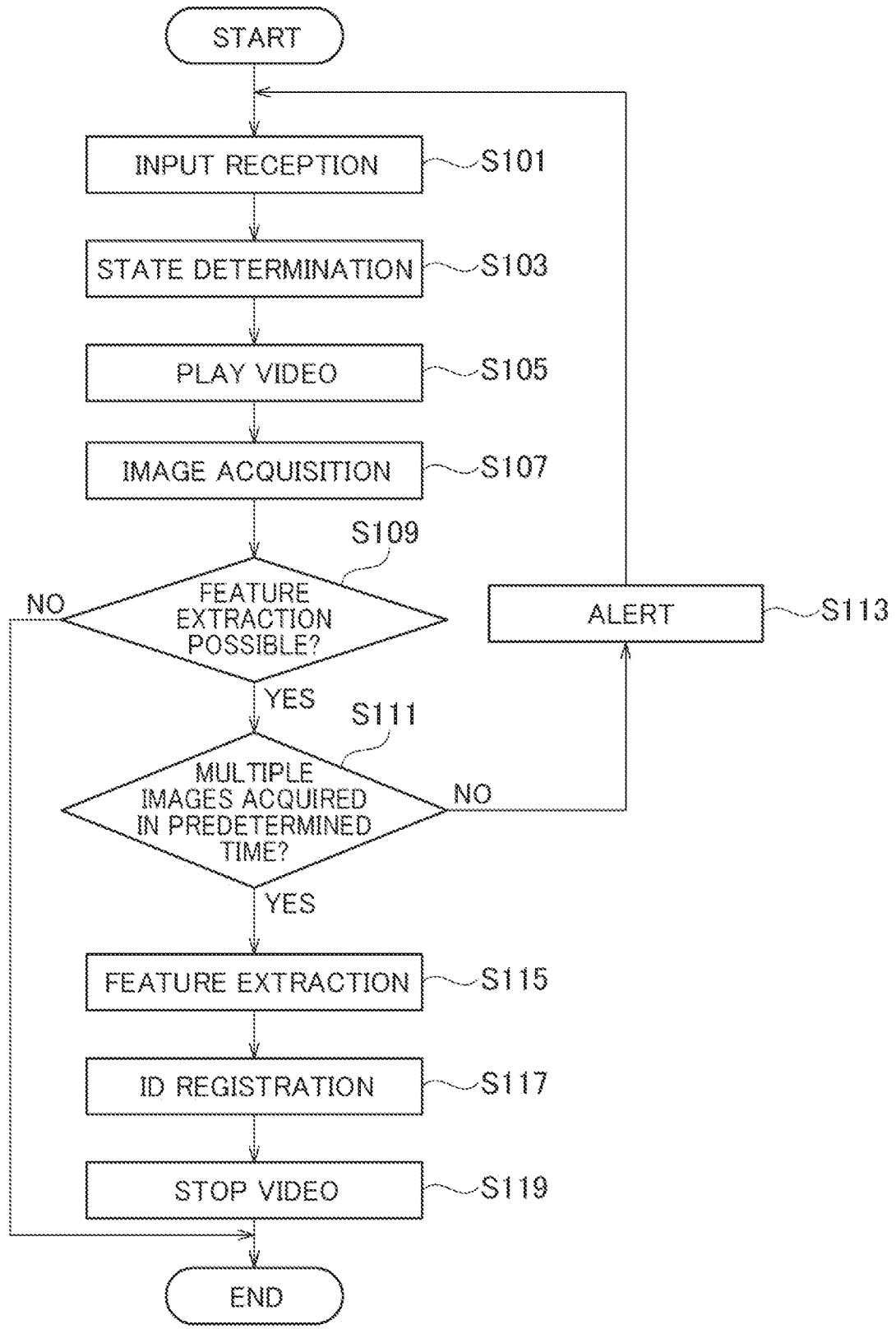
FIG. 10 is a flowchart illustrating an operation example of the image processing device 1 according to the embodiment of the present invention.

Since the processing in steps S205 to S215 is the same as the processing in steps S105 to S115 in FIG. 10, the description thereof will be omitted. In step S217, the feature amount comparison unit 26 compares the features of face data extracted in step S215 with the features of face data stored in the storage device 14. The feature amount comparison unit 26 outputs a face ID having the highest similarity as a recognition result to the ID authentication unit 27. The processing proceeds to step S219, and the ID authentication unit 27 authenticates the face ID. Note that when the features of face data extracted in step S215 do not match the features of face data stored in the storage device 14, that is, when there is no face ID that matches the face data extracted in step S215, the ID authentication unit 27 may authenticate the user as "GUEST". In the present embodiment, "GUEST" means that the user is not a unique user whose face ID is registered, and when the user is authenticated as "GUEST", initial values are reflected in various settings. The ID authentication unit 27 transmits a signal indicating that the authentication of the face ID has been completed to the video playback unit 23 and the notification unit 28. The processing proceeds to step S221, and the video playback unit 23 stops the video when receiving the signal, and the notification unit 28 notifies the user that the authentication has been completed.

Action and Effect

As described above, the image processing device 1 according to the present embodiment can obtain the following action and effect.

The image processing device 1 includes the camera 11 that captures an image of a user, the controller 20 that performs registration or authentication of face data of the user by using images captured by the camera 11, and a display that displays a video. The controller 20 performs registration or authentication of the face data of the user using multiple face images which are different from each other and in which orientations of the face captured by the camera 11 are each within the first angles 61 and 62 that is based on a state in which the user faces the front of the camera 11. The controller 20 displays on the display 12 a video in which a human face-imitating image changes its face orientation until the registration or authentication is completed. The second angle formed by a direction from the user's seating position toward the camera 11 and a direction from the user's seating position toward the display 12 is smaller than the first angles 61 and 62.

Even when the user moved the face while gazing at the display 12, the angle range in which the user moved the face partially overlaps with the range of the predetermined angle 52. Thus, images required for registration or authentication of a face ID is quickly acquired. By encouraging the user to move the face through the video, it becomes possible to capture multiple face images each having a different face orientation in a short time, and the time required for registration of face data is reduced. Note that in the multiple face images each having a different face orientation, the face orientations are all different.

The camera 11 is installed in front of the seat in the vehicle. The direction in which the face orientation is changed includes any one of up, down, left, and right directions, or a combination of up, down, left, and right directions (see FIG. 4). The camera 11 and the display 12 are installed so as to be arranged in the vehicle width direction or in the vehicle height direction (see FIG. 2). When the user is sitting in the driver's seat, the camera 11 can capture images of the user from the front.

While the video is displayed on the display 12, the controller 20 may notify the user to change the face orientation at the same speed as the human face-imitating image changes its face orientation. As a notification method, there is a notification using text information or a notification using voice. As the notification using text information, the controller 20 may display the text "Please change your face orientation at the same speed as in the video" on the display 12. As the notification using voice, the controller 20 may provide, through the speaker 13, the voice notification "Please change your face orientation at the same speed as in the video". This prevents the user from moving too quickly or too slowly.

When the video is displayed on the display 12, the controller 20 may notify the user to change the face orientation in the same manner as in the video until registration or authentication is completed. When the video is displayed on the display 12, the controller 20 may notify the user to face in the direction of the camera 11 and to change the face orientation in the vertical and horizontal directions in the same manner as in the video, until registration or authentication is complete. Notification method examples have been described in the above-described S111. The user is prevented from stopping movement before registration or authentication is completed. The user can be facilitated to change the face orientation on the basis of a state where the user faces the front of the camera 11, and the angle range in which the user moved the face is likely to overlap with the range of predetermined angle 52. Images required for registration or authentication of a face ID are acquired more quickly.

In the present embodiment, face images captured by the camera 11 may be taken in any direction as long as the orientations are different. However, for example, a condition may be added that at least one face image oriented in each of the four directions of up, down, left, and right is required. In this condition, when face images oriented in the up, down, and right directions are acquired, but a face image oriented in the left direction is not acquired, the controller 20 may notify the user of the missing orientation (left direction). As a notification method, the color may be changed when the CG image is oriented in the left direction.

The camera 11 is installed in front of the seat in the vehicle. The camera 11 and the display 12 may be installed so as to be arrange in the longitudinal direction of the vehicle. When the user gazes steadily at the display 12, the user will also face the front of the camera 11. This makes it easier to capture distinctive face images.

The image processing device 1 may further include a sensor that detects the sitting height of the user. The controller 20 may change the video displayed on the display 12 according to the sitting height detected by the sensor. The height relative to the camera 11 differs between a user having a low sitting height and a user having a high sitting height. The controller 20 can play a video according to the angle at which the user is seen from the camera 11. To correspond to the sitting height, multiple videos are stored in the storage device 14.

Either one of the angles at which the human face-imitating image shakes the head in the right direction and the left direction may be larger than the second angle. By making the angle at which the image shakes the head toward the direction of the camera 11 when viewed from the display 12 larger than the second angle, even when the range of the second angle is larger than the range of the predetermined angle 52, the range 65 in which the user moves the face while gazing at the video partially overlaps with the predetermined angle 52, and thus the left and right face orientations of the user 50 can be captured within the range of the predetermined angle 52.

The controller 20 may determine whether the user's line of sight is toward the camera 11 or toward the display 12 based on an image captured by the camera 11. The controller 20 may change the video to be displayed on the display 12 based on the determination result. Thus, the controller 20 can play a video corresponding to the user's line of sight. To correspond to the user's line of sight, multiple videos are stored in the storage device 14.

When the controller 20 determines that the line of sight of the user 50 is toward the display 12, either one of the angles at which a human face-imitating image shakes the head in the right direction and in the left direction may be made larger than the second angle. Thus, when the line of sight of the user 50 is toward the display 12, the controller 20 can play a video in which the angle of shaking the head toward the direction of the camera 11 when viewed from the display 12 is larger than the second angle. Since the range 65 where the user moves the face while gazing at the video partially overlaps with the predetermined angle 52, the left and right face orientations of the user 50 within the predetermined angle 52 can be captured.

When the controller 20 determines that the user's line of sight is toward the display 12, the angle in the opposite direction from either one of the angles at which the human face-imitating image shakes the head in the right direction and in the left direction may be made smaller than the second angle. By making the angle of shaking the head in the opposite direction toward the camera 11 when viewed from the display 12 smaller than the second angle, the range 66 in which the user moves the face while gazing at the video becomes small, and it is possible to prevent images having face orientations outside the predetermined angle 52 from being captured. The image processing unrequired for registration or authentication of a face ID can be suppressed, and the processing load of the controller 20 can be reduced.

In a video in which a human face-imitating image changes its face orientation, the area 40 above the neck moves, while the area 41 below the neck does not move. This makes it easier for the user to move the face according to the video.

Each of the functions described in the above-mentioned embodiment can be implemented by one or more processing circuits. The processing circuit includes a programmed processing device such as a processing device including electrical circuits. The processing circuit also includes devices such as an application specific integrated circuit (ASIC) arranged to perform the described functions and circuit components.

Although the embodiment according to the present invention has been described above, the statements and drawings that form part of this disclosure should not be understood as limiting the present invention. Various alternative embodiments, examples, and operational techniques will be apparent to those skilled in the art from this disclosure.

For example, the image processing device 1 has been described as a device to be mounted on a vehicle, but is not limited thereto. The image processing device 1 may be a terminal device (e.g., a smartphone). When the image processing device 1 is a terminal device, the terminal device may capture images of a user with a camera while playing a video on the display. Processing related to registration or authentication of a face ID is realized by a controller incorporated in the terminal device.

Figure 12:
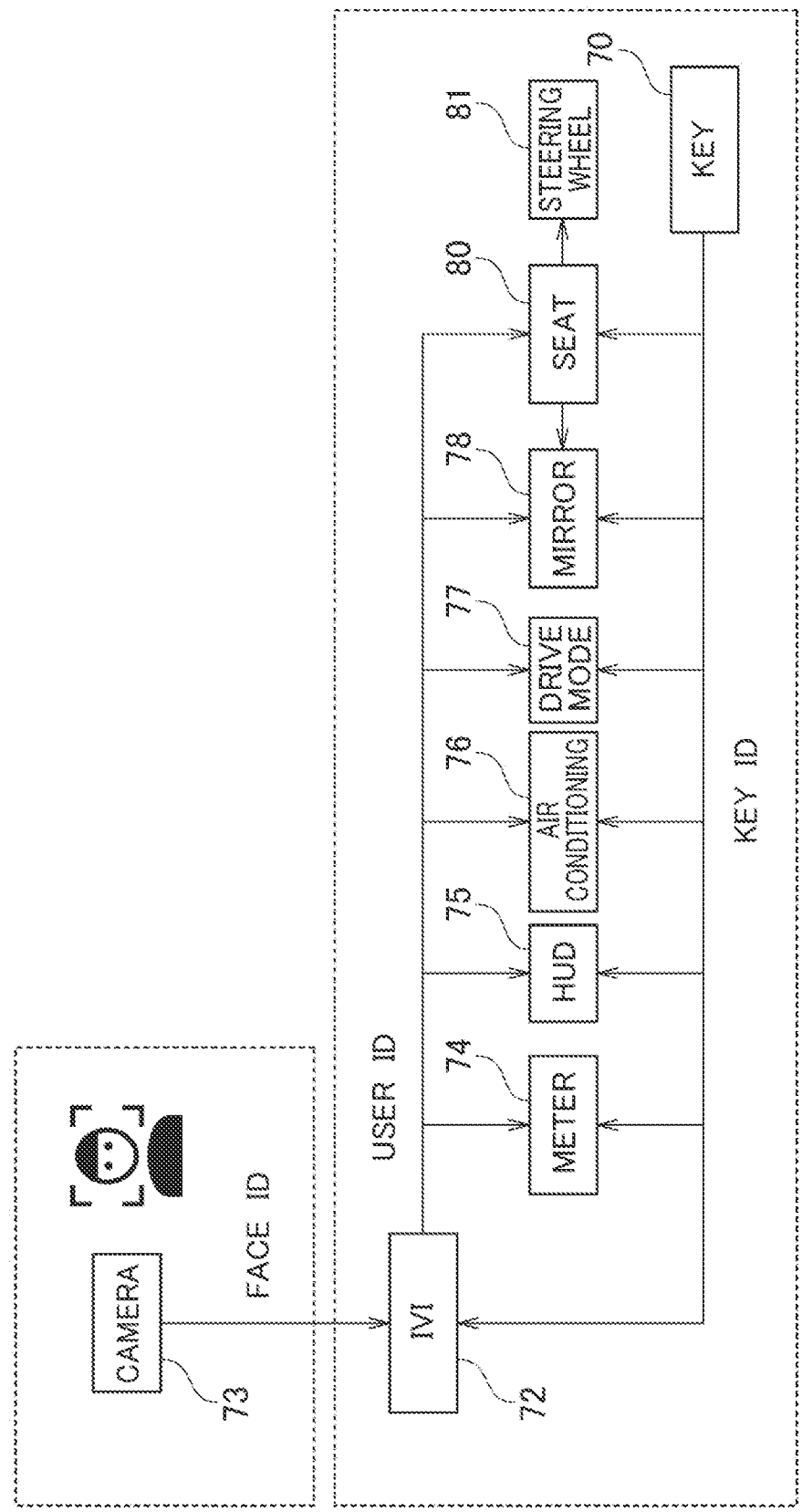
FIG. 12 is a diagram illustrating an example of a method for using a face ID.

An example of a face ID usage method will be described with reference to FIG. 12. As illustrated in FIG. 12, there is a known technique that links a vehicle key ID (an ID transmitted from a key 70) with an in-vehicle device and controls an in-vehicle device and function according to the key ID. Examples of the onboard device associated with the key ID include a meter 74, a HUD 75, a mirror 78, a seat 80, and a steering wheel 81. Examples of a function associated with the key ID include air conditioning 76 and a drive mode 77. Here, a single vehicle may be used by multiple people in common. An example is family sharing. When a vehicle is shared, there is usually one key. Therefore, it is not possible to set in-vehicle devices and functions according to the preferences of multiple people by using only the key ID.

Then, face IDs are used. By logging in to IVI72 (in-vehicle infotainment) using a face ID, a user ID associated with the face ID becomes available. It is sufficient to associate the setting of in-vehicle devices and functions with this user ID. By using two IDs, the key ID and the user ID (face ID), it is possible to set in-vehicle devices and functions according to the preferences of each user, even when a vehicle is shared.

REFERENCE SIGNS LIST

1 Image processing device
11 Camera
12 Display
13 Speaker
14 Storage device
20 Controller
21 Input reception unit,
22 State determination unit
23 Video playback unit
24 Feature amount extraction unit
25 ID registration unit
26 Feature amount comparison unit
27 ID authentication unit
28 Notification unit

The invention claimed is:

1. An image processing device, comprising:
a camera that captures an image of a user;
a controller that performs registration or authentication of face data of the user by using an image captured by the camera; and
a display that displays a video,
wherein the controller;
performs registration or authentication of face data of the user by using a plurality of face images which are different from each other and in which orientations of a face captured by the camera are each within a first angle that is based on a state in which the user faces a front of the camera,
displays on the display a video in which a human face-imitating image changes its face orientation until the registration or the authentication is completed,
determines whether a line of sight of the user is toward the camera or toward the display based on the image captured by the camera, and
when determining that the line of sight of the user is toward the display, sets either one of an angle at which the human face-imitating image shakes a head in a right direction and an angle at which the human face-imitating image shakes a head in a left direction to be larger than a second angle formed by a direction from a seating position of the user toward the camera and a direction from the seating position of the user toward the display.

2. The image processing device according to claim 1, wherein the camera is installed in front of a seat in a vehicle,
wherein a direction in which the face orientation is changed includes any one of up, down, left, and right directions, or a combination of up, down, left, and right directions, and
wherein the camera and the display are installed so as to be arranged in a vehicle width direction or in a vehicle height direction.

3. The image processing device according to claim 1, wherein while displaying the video on the display, the controller notifies the user to change a face orientation at a same speed as a speed at which the human face-imitating image changes its face orientation.

4. The image processing device according to claim 1, wherein while displaying the video on the display, the controller notifies the user to change a face orientation in a same manner as in the video until the registration or the authentication is completed.

5. The image processing device according to claim 1, wherein while displaying the video on the display, the controller notifies the user to face in a direction of the camera and change a face orientation in up, down, left, and right directions in a same manner as in the video until the registration or the authentication is completed.

6. The image processing device according to claim 1, wherein the controller notifies the user of a missing orientation among face images captured by the camera and each having a different face orientation.

7. The image processing device according to claim 1, wherein the camera is installed in front of a seat in a vehicle, and
wherein the camera and the display are installed so as to be arranged in a longitudinal direction of the vehicle.

8. The image processing device according to claim 1, further comprising:
a sensor that detects a sitting height of the user,
wherein the controller changes the video to be displayed on the display in accordance with the sitting height detected by the sensor.

9. The image processing device according to claim 1, wherein either one of an angle at which the human face-imitating image shakes a head in a right direction and an angle at which the human face-imitating image shakes a head in a left direction is larger than the second angle.

10. The image processing device according to claim 1, wherein the controller, when determining that the line of sight of the user is toward the display, sets an angle opposite to either one of an angle at which the human face-imitating image shakes a head in a right direction and an angle at which the human face-imitating image shakes a head in a left direction to be smaller than the second angle.

11. The image processing device according to claim 1, wherein in the video in which the human face-imitating image changes a face orientation, an area above a neck moves while an area below the neck does not move.

12. An image processing method for an image processing device including a camera that captures an image of a user, a controller that performs registration or authentication of face data of the user by using an image captured by the camera, and a display that displays a video, the method comprising:
performing, by a controller, registration or authentication of face data of the user by using a plurality of face images different from each other in which orientations of a face captured by the camera are each within a first angle that is based on a state in which the user faces a front of the camera,
displaying, by a controller, on the display a video in which a human face-imitating image changes its face orientation until the registration or the authentication is completed,
determining whether a line of sight of the user is toward the camera or toward the display based on the image captured by the camera, and
when determining that the line of sight of the user is toward the display, sets either one of an angle at which the human face-imitating image shakes a head in a right direction and an angle at which the human face-imitating image shakes a head in a left direction to be larger than a second angle formed by a direction from a seating position of the user toward the camera and a direction from the seating position of the user toward the display.

* * * * *